ary-loxyalkoxyguanidines of the formula

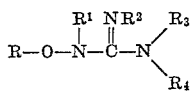

wherein R is selected from the group consisting aralkyl and aryloxyalkyl, wherein the aryl moiety of R is substituted by a member of the group consisting of hydrogen, alkyl, alkoxy, halogen, nitro and phenyl, and the alkyl groups of R contain from one to three carbon atoms, inclusive; $R^1$, $R^2$, $R^3$ and $R^4$ are selected from the group consisting of hydrogen and alkyl, and addition salts thereof, together with compositions of said compounds and method of their use as anoretic agents in mammals.

This application is a continuation-in-part of my applications Ser. No. 349,169, filed Mar. 3, 1964, now abandoned, and Ser. No. 383,231, filed July 16, 1964, now United States Patent No. 3,304,324, patented on Feb. 14, 1967.

This invention relates to novel compounds and to a process for their preparation; it is particularly directed to novel aralkoxyguanidines and aryloxyalkoxyguanidines, the acid addition salts thereof, and to methods for their preparation.

The novel aralkoxyguanidines and aryloxyalkoxyguanidines are represented by the formula

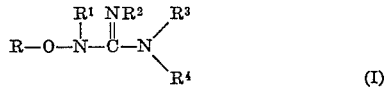

wherein R is selected from the group consisting of aralkyl and aryloxyalkyl, wherein the aryl moiety of R is substituted by a member of the group consisting of hydrogen, alkyl, alkoxy, halogen, nitro and phenyl, and the alkyl groups of R contain from one to three carbon atoms, inclusive; $R^1$, $R^2$, $R^3$ and $R^4$ are selected from the group consisting of hydrogen and alkyl, wherein the alkyl radicals are particularly those containing from one to four carbon atoms, such as methyl, ethyl, propyl and butyl. The compounds of Formula I possess novel anoretic activity and correspondingly are useful for weight reducing in mammals.

The novel aralkoxy- and aryloxyalkoxyguanidines of Formula I exist either in the non-protonated (free base) form or the protonated form depending upon the pH of the environment. They form stable protonates (acid addition salts) on neutralization with suitable acids, for example, hydrochloric, hydrobromic, sulfuric, phosphoric, nitric, thiocyanic, fluosilicic, acetic, benzoic, salicylic, glycolic, succinic, nicotinic, tartaric, maleic, malic, lactic, methanesulfonic, and cyclohexanesulfamic acids, and the like. The acid addition salts are useful in upgrading the free bases. The free bases are useful as acid acceptors in neutralizing undesirable acidity or in absorbing an acid as it is formed in a chemical reaction, for example, a dehydrohalogenation reaction in which hydrogen and chlorine, bromine, or iodine, are removed from vicinal carbon atoms.

The thiocyanic acid addition salts of the guanidines of Formula I, when condensed with formaldehyde, form resinuous materials useful as pickling inhibitors according to U.S. Patents 2,425,320 and 2,606,155. The compounds of Formula I also form fluosilicic acid addition salts which are useful as mothproofing agents according to U.S. Patent 2,205,789.

The novel aralkoxyguanidines (I) and aryloxyalkoxyguanidines (I) of the invention are prepared by reacting an acid addition salt of 2-methyl-2-thiopseudourea (e.g., the sulfate) with an aralkoxyamine or aryloxyalkoxyamine of the formula

wherein R and $R^1$ have the same meaning as above. The reaction advantageously is effected in the presence of an inert liquid medium such as absolute or aqueous alkanol (e.g., absolute ethanol, 50% aqueous ethanol, 75% aqueous ethanol or 50% aqueous methanol) at temperatures ranging between about 50° and about 100° C., conveniently reflux temperature, for from about 2 to about 20 hours. The resulting acid addition salt (I) can be converted to the free base form by treatment with aqueous alkali hydroxine, e.g., sodium or potassium hydroxide, and the liberated free base can be converted to acid addition salts by neutralization, e.g., with the acids given above. Acid addition salts can also be formed by metathesis. For example, in cases where the acid addition salts of the compounds of Formula I are not readily obtained in the crystalline state (e.g., the hydrochloride of Example 1A below), they can be converted to crystalline acid addition salts such as the nitrate by saturation in aqueous solution with a water-soluble salt, particularly with a water-soluble nitrate such as ammonium nitrate or an alkali-metal nitrate. The process is illustratively represented by the following equation:

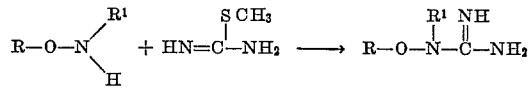

wherein R and $R^1$ have the same meaning as above.

Instead of employing 2-methyl-2-thiopseudourea as the guanylating agent, cyanamide, alkylcyanamide or dialkylcyanamide can be used. Thus, reacting the cyanamide compound with an acid addition salt of an aralkoxyamine or aryloxyalkoxyamine of the formula

wherein R and $R^1$ have the same meaning as above, yields the corresponding aralkoxyguanidine (I) or aryloxyalkoxyguanidine (I) in the form of an acid addition salt. In general, the reaction can be carried out at temperatures ranging between about 30° and about 200° C., for from 1 to about 20 hours. In many instances, particularly when the reaction is quite vigorous, it is advantageous to carry out the reaction in the presence of an inert liquid medium such as benzene, toluene, xylene, cumene, cymene, and the like. The acid addition salt thus obtained can, if desired, be converted to the free base form as noted above.

The process is illustratively represented by the following equation:

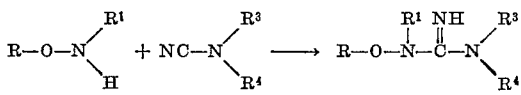

wherein R, R¹, R³ and R⁴ have the same meaning as above.

Instead of employing 2-methyl-2-thiopseudourea, cyanamide, alkylcyanamide or dialkylcyanamide as the guanylating agent, a dialkylcarbodiimide can be used. Reacting a dialkylcarbodiimide with an aralkoxyamine or aryloxyalkoxyamine of the formula

wherein R and R¹ have the same meaning as above, yields the corresponding aralkoxyguanidine (I) or aryloxyalkoxyguanidide (I). In general, the reaction can be carried out at temperatures ranging between about 60° and about 125° C., for from about 2 to about 20 hours; if desired, an inert liquid medium, e.g., tert.butyl alcohol, can be included in the reaction mixture. The thus produced free bases on neutralization with a suitable acid, e.g., hydrochloric, hydrobromic or sulfuric, yield the corresponding acid addition salts. The process utilizing a dialkylcarbodiimide for preparing the above guanidines (I) is carried out in accordance with the following equation:

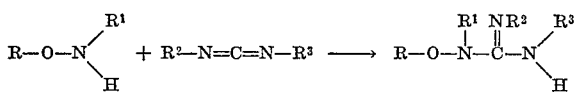

wherein R and R¹ have the same meaning as above, and R² and R³ are alkyl.

The starting compounds embraced by Formula II can be prepared by known methods, for example, those disclosed in the following publications: Angew. Chem. 68, 303; J. Amer. Chem. Soc. 70, 2829; Ann. 257, 203; Can. J. Chem. 38, 343; J. Med. Pharm. Chem. 4, 51; J. Med. Chem. 7, 329; Helv. Chim. Acta 45, 1381; J. Chem. Soc. 229 (1960), 3915 (1962); Chimia 18, 1; and Belgian Patent 612,879.

The novel compounds of Formula I, both in their nonprotonated and protonated forms with pharmacologically acceptable acids, for example, hydrochloric, hydrobromic, sulfuric, phosphoric, nitric, acetic, benzoic, salicylic, glycolic succinic, nicotinic, tartaric, malec, malic lactic, methanesulfonic, and cyclohexanesulfamic acids, and the like, exhibit pharmacological activity. The compounds of Formula I in their nonprotonated and protonated forms (as above described) exhibit central nervous system stimulating, hypocholesteremic, fat oxidative, anorexigenic, vasodilating, anticholinergic, antiinflammatory, antibacterial and antifungal activities and are useful in arresting or alleviating central nervous system depression, atherosclerosis, obesity, hunger, hypertension, inflammation, bacterial and fungal infection in mammals and animals, e.g., mice, rats and birds (e.g., poultry).

The invention can be more fully understood by the following examples which embody the best manner known for carrying it out.

EXAMPLE 1

A. *1-benzyloxylguanidine nitrate (I)*

A mixture of 24.6 g. (0.2 mole) of benzyloxyamine (II) (prepared as in Angew. Chem. 68, 303) and 27.8 g. (0.2 mole) of 2-methyl-2-thiopseudourea sulfate in 150 ml. of absolute ethanol was heated under reflux for 4 hours, then refrigerated and filtered to remove 10.5 g. of unreacted 2-methyl-2-thiopseudourea sulfate. The filtrate was concentrated under reduced pressure and the syrupy residue was boiled with 100 ml. of acetone for 1 hour to destroy unreacted benzyloxyamine. After evaporation of the acetone, the residue was dissolved in water, rendered alkaline with sodium hydroxide and extracted repeatedly with ether. The combined ether extracts were dried over magnesium sulfate, then mixed with ethereal hydrogen chloride.

The resulting oily 1-benzyloxyguanidine hydrochloride was dissolved in 50 ml. of water and the resulting solution was saturated with ammonium nitrate. The precipitated solid was separated by filtration and washed with a small amount of ice water to give 7.5 g. (16% yield) of product which decomposed at 102° C. A sample recrystallized from a mixture of 95% ethanol and anhydrous ether gave small needles of 1-benzyloxyguanidine nitrate (I) which decomposed of 102° C.

*Analysis.*—Calcd. for $C_8H_{11}N_3O \cdot HNO_3$: C, 42.10; H, 530; N, 24.55. Found: C, 42.20; H, 5.09; N, 24.38.

Infrared absorption data supported the structure.

On basifying an aqueous solution of the nitrate with sodium hydroxide or potassium hydroxide, the free base form, 1-benzyloxyguanidine, is obtained.

B. *1-benzyloxyguanidine (I)*

To a stirred suspension of 200 g. (1.25 moles) of benzyloxyamine hydrochloride in 1.25 l. of toluene under an amtosphere of nitrogen, 52.5 g. (1.25 moles) of cyanamide was added. The mixture was heated under reflux, and shortly after the initiation of reflux, the insoluble solid benzyloxyamine hydrochloride was converted to an insoluble oil, 1-benzyloxyguanidine hydrochloride. Refluxing was continued for 2 hours. The toluene was evaporated under reduced pressure, and the gummy residue was suspended in 1.5 l. of water and basified with aqueous sodium hydroxide. Crystallization occurred rapidly following the addition of base; the suspension was thoroughly chilled, and the crystalline product was collected, washed with water and dried to give 148 gm. (72% yield) of 1-benzyloxyguanidine (I) having a melting point of 103 to 106° C.

The hydrochloric, hydrobromic and sulfuric acid addition salts of the above produced free base, 1-benzyloxyguanidine, are prepared by adding ethereal hydrogen chloride, hydrogen bromide and sulfuric acid, respectively, to a solution of the free base in ethyl acetate.

By neutralization with cyclohexanesulfamic acid, the free base 1-benzyloxyguanidine was converted to its cyclohexanesulfamate (I), melting at 106 to 108° C.

*Analysis.*—Calcd. for $C_8H_{11}N_3O \cdot C_6H_{13}NO_3S$: C, 48.82; H, 7.02; N, 16.27; S, 9.31. Found: C, 48.95; H, 7.16; N, 16.16; S, 9.18.

EXAMPLE 2

*1-(2-phenylethoxy)guanidine and cyclohexane sulfamate thereof (I)*

Following the procedure of Example 1B but substituting 2-phenylethoxyamine hydrochloride (II) (J. Med. Pharm. 4, 51) for benzyloxyamine hydrochloride (II) and substituting benzene for toluene, and maintaining the reaction mixture between 70° and 75° C. for 2 hours, yielded 1-(2-phenylethoxy)guanidine (I), melting at 77 to 78° C.

*Analysis.*—Calcd. for $C_9H_{13}N_3O$: C, 60,31; H, 7.31; N, 23.45. Found: C, 60.45; H, 7.33; N, 23.67.

The free base was neutralized with cyclohexanesulfamic acid to obtain its cyclohexanesulfamate (I), melting at 91 to 93° C.

*Analysis.*—Calcd. for $C_9H_{13}N_3O \cdot C_6H_{13}NO_3S$: C, 50.26; H, 7.31; N, 15.63; S, 8.95. Found: C, 50.28; H, 7.25; N, 15.56; S, 9.19.

EXAMPLE 3

*1-(1-phenylethoxy)guanidine and cyclohexanesulfamate thereof (I)*

Following the procedure of Example 1B but substituting 1-phenylethoxyamine hydrochloride (II) (Helv. Chim.

Acta 45, 1381) for benzyloxyamine hydrochloride (II) and substituting benzene for toluene, and maintaining the reaction mixture at reflux temperature for 2 hours, yielded 1-(1-phenylethoxy)guanidine (I). The free base was neutralized with cyclohexanesulfamic acid to obtain its cyclohexanesulfamate (I), melting at 106 to 109° C.

*Analysis.*—Calcd. for $C_9H_{13}N_3O \cdot C_6H_{13}NO_3S$: C, 50.26; H, 7.31; N, 15.63; S, 8.95. Found: C, 50.40; H, 7.14; N, 15.57; S, 9.56.

EXAMPLE 4

1-(3-phenylpropoxy)guanidine and salts thereof (I)

The corresponding free base (II), prepared from 18.8 g. (0.1 mole) of 3-phenylpropoxyamine hydrochloride (Helv. Chim. Acta 45, 1381) by treatment with alkali, was dissolved in 100 ml. of 50% aqueous methanol. To this solution, 13.9 g. (0.1 mole) of 2-methyl-2-thiopseudourea sulfate was added and the mixture was heated under reflux for 6 hours, then evaporated to dryness under reduced pressure. The residue was dissolved in 500 ml. of 50% aqueous methanol and the solution was saturated with ammonium nitrate. Methanol was evaporated on the steam bath under an air stream, and the remaining aqueous solution was refrigerated. The solid that precipitated was separated by filtration and recrystallized twice from a mixture of methyl ethyl ketone and ethyl acetate to give 13 g. (51% yield) of 1-(3-phenylpropoxy)guanidine nitrate (I) as white needles which decomposed sharply at 111° C.

*Analysis.*—Calcd. for $C_{10}H_{15}N_3O \cdot HNO_3$: C, 46.87; H, 6.29; N, 21.86. Found: C, 46.67; H, 6.31; N, 22.07.

Infrared spectra supported the structure.

On basifying an aqueous solution of the nitrate with sodium hydroxide or potassium hydroxide, the free base form, 1-(3-phenylpropoxy)guanidine, is obtained.

The free base was neutralized with cyclohexanesulfamic acid to obtain 1-(3-phenylpropoxy)guanidine cyclohexanesulfamate (I), melting at 125.5 to 128° C.

*Analysis.*—Calcd. for $C_{10}H_{15}N_3O \cdot C_6H_{13}NO_3S$: C, 51.59; H, 7.58; N, 15.04; S, 8.61. Found: C, 51.64; H, 7.43; N, 15.33; S, 8.70.

The free base was neutralized with hydrogen chloride to obtain 1-(3-phenylpropoxy)guanidine hydrochloride (I), melting at 96 to 98° C.

*Analysis*—Calcd. for $C_{10}H_{15}N_3O \cdot HCl$: C, 52.28; H, 7.02; N, 18.29; Cl, 15.44. Found: C, 52.53; H, 7.13; N, 18.31; Cl, 15.39.

EXAMPLE 5

1-(4-methylbenzyloxy)guanidine nitrate (I)

Ten grams (0.0575 mole) of 4-methylbenzyloxyamine hydrochloride was converted to its free base (II) [J. Chem. Soc. 229, (1960)] with alkali. The free base was mixed with 300 ml. of 50% aqueous ethanol and 8 g. (0.0575 mole) of 2-methyl-2-thiopseudourea sulfate, and the mixture was heated under reflux for 16 hours. Solvent was removed under reduced pressure. The residue was dissolved in 50 ml. of water and the solution was saturated with ammonium nitrate. The solid that precipitated was recrystallized consecutively from absolute ethanol-anhydrous ether and isopropyl alcohol-anhydrous ether but remained impure. Accordingly, the free base was regenerated and the nitrate salt was re-formed as before to give 611 mg. of 1-(4-methylbenzyloxy)guanidine nitrate (I) which decomposed at 105° C.

*Analysis.*—Calcd. for $C_9H_{13}N_3O \cdot HNO_3$: C, 44.62; H, 5.83; N, 23.13. Found: C, 44.53; H, 5.89; N, 22.82.

Infrared spectra supported the structure.

On basifying an aqueous solution of the nitrate with sodium hydroxide or potassium hydroxide, the free base form, 1-(4-methylbenzyloxy)guanidine, is obtained.

EXAMPLE 6

1-(4-methoxybenzyloxy)guanidine nitrate (I)

Four grams (0.02 mole) of 4-methoxybenzyloxyamine hydrochloride was converted with alkali to the free base (II) [J. Chem. Soc. 3915 (1962)] and then to 1-(4-methoxybenzyloxy)guanidine nitrate (I) in the manner described in Example 5. The compound decomposed at 105° C.

*Analysis.*—Calcd. for $C_9H_{13}N_3O_2 \cdot HNO_3$: C, 41.86; H, 5.46; N, 21.70. Found: C, 41.03; H, 5.44; N, 22.20.

Infrared spectra supported the structure.

On basifying an aqueous solution of the nitrate with sodium hydroxide or potassium hydroxide, the free base form, 1-(4-methoxybenzyloxy)guanidine, is obtained.

EXAMPLE 7

1-(4-chlorobenzyloxy)guanidine nitrate (I)

Thirty grams (0.15 mole) of 4-chlorobenzyloxyamine hydrochloride was converted to the free base (II) (Can. J. Chem. 38, 343). The free base was dissolved in 500 ml. of 75% ethanol, and the solution was treated with 21.6 g. (0.15 mole) of 2-methyl-2-thiopseudourea sulfate and heated under reflux for 16 hours. Upon cooling, 5 g. of white solid precipitated and was removed by filtration and discarded. The filtrate was evaporated under reduced pressure and the residue was dissolved in a mixture of 200 ml. of ethanol and 50 ml. of water, then saturated with ammonium nitrate. The precipitated product was recrystallized twice from methanol to give 8 g. (20% yield) of white 1-(4-chlorobenzyloxy)guanidine nitrate (I) which decomposed at 138° C.

*Analysis.*—Calcd. for $C_8H_{10}ClN_3O \cdot HNO_3$: C, 36.58; H, 4.22; N, 21.33; Cl, 13.50. Found: C, 36.68; H, 4.59; N, 21.01; Cl, 13.63.

Infrared spectra supported the structure.

On basifying an aqueous solution of the nitrate with sodium hydroxide or potassium hydroxide, the free base form, 1-(4-chlorobenzyloxy)guanidine, is obtained.

Following the procedure of Example 1B but employing 3 g. of 4-chlorobenzyloxyamine hydrochloride, 0.65 g. of cyanamide, and 30 ml. of toluene, yielded 1-(4-chlorobenzyloxy)guanidine hydrochloride. The latter was treated with ammonium nitrate by the procedure described in Example 7 to obtain 3.1 g. of 1-(4-chlorobenzyloxy) guanidine nitrate (I), melting at 144° C. with decomposition.

EXAMPLE 7A

1-(2,6-dichlorobenzyloxy)guanidine hydrochloride (I)

(a) *N - (2,6-dichlorobenzyloxy)phthalimide.*—A solution of 39.1 g. (0.2 mole) of 2,6-dichlorobenzyl chloride, 32.6 g. (0.2 mole) of N-hydroxyphthalimide, and 61 ml. of triethylamine in 300 ml. of dimethylformamide was stirred and warmed on a steam bath for 70 minutes, cooled and diluted with 500 ml. of water to give 60.5 g. of N-(2,6-dichlorobenzyloxy)phthalimide, having a melting point of 167 to 168° C. Recrystallization from ethanol did not change the melting point.

*Analysis.*—Calcd. for $C_{15}H_9Cl_2NO_3$: C, 55.92; H, 2.82; Cl, 22.01; N, 4.35. Found: C, 55.67; H, 3.03; Cl, 22.25; N, 4.26.

The infrared and ultraviolet spectra were consistent with the structure.

(b) *2,6 - dichlorobenzyloxyamine hydrochloride.*—A suspension of 55 g. (0.17 mole) of N-(2,6-dichlorobenzyloxy)phthalimide [from (a), above] in 500 ml. of methylene chloride was treated with 8.6 g. of hydrazine hydrate in a small volume of methanol and stirred for 23 hours at room temperature. Solid material was removed by filtration and washed with methylene chloride. The combined filtrate and washings were evaporated to dryness under reduced pressure and the residue was extracted with ether. The ethereal extracts were acidified with an isopropyl alcohol solution of hydrogen chloride to give 38.2 g. of product, which melted at 199 to 201° C. with decomposition. Recrystallization from a mixture of methanol and ethyl acetate gave 27.2 g. of 2,6-dichlorobenzyloxyamine hydrochloride, melting at 206° C. with decomposition.

Analysis.—Calcd. for $C_7H_7Cl_2NO \cdot HCl$: C, 36.79; H, 3.53; Cl, 46.55; N, 6.13. Found: C, 37.21; H, 3.51; Cl, 46.50; N, 6.31.

The infrared and ultraviolet spectra were consistent with the structure.

(c) *1 - (2,6-dichlorobenzyloxy)guanidine hydrochloride (I)*.—A toluene suspension of 11.4 g. (0.05 mole) of 2,6-dichlorobenzyloxyamine hydrochloride [from (b), above] and 2.1 g. of cyanamide was vigorously stirred and refluxed under nitrogen for an hour. The solvent was removed by evaporation under reduced pressure; trituration of the residue with ethyl acetate gave 12.42 g. of crude 1-(2,6-dichlorobenzyloxy)guanidine hydrochloride melting at 109 to 111° C. The crude salt was suspended in water, and the mixture was cooled and basified with sodium hydroxide. The thus obtained free base, 1-(2,6-dichlorobenzyloxy)guanidine (I), melting at 145 to 148° C., was dissolved in a mixture of methylene chloride and ethyl acetate. The solution was clarified with Celite (diatomaceous earth) and was then acidified with an isopropyl alcohol solution of hydrogen chloride to give 9.5 g. of hydrochloride, which melted at 128 to 130° C. An analytical sample was recrystallized from a mixture of methanol and isopropyl alcohol to give pure 1-(2,6-dichlorobenzyloxy guanidine hydrochloride (I), with a melting point of 131 to 132° C.

Analysis.—Calcd. for $C_8H_9Cl_2N_3O \cdot HCl$: C, 35.51; H, 3.72; N, 15.53; Cl, 39.32. Found: C, 35.69; H, 3.76; N, 15.34; Cl, 38.82.

On basifying an aqueous solution of the hydrochloride with sodium hydroxide or potassium hydroxide, the free base form, 1-(2,6-dichlorobenzyloxy)guanidine, is obtained.

EXAMPLE 8

*1-benzhydryloxyguanidine nitrate (I)*

Benzhydryloxyamine (II), obtained from 23.6 g. (0.1 mole) of its hydrochloride (prepared by reacting N-hydroxyphthalimide with benzhydryl chloride in the presence of dimethylformamide and triethylamine to give N-benzhydryloxyphthalimide, followed by reaction with hydrazine hydrate in the presence of dimethylformamide and methanol, and then by treatment with hydrochloric acid) by treatment with alkali, was dissolved in 100 ml. of 50% ethanol. The solution was treated with 13.9 g. (0.1 mole) of 2-methyl-2-thiopseudourea sulfate and heated under reflux for 4 hours. Solvent was removed under reduced pressure. The gummy residue was dissolved in 100 ml. of water and the solution was saturated with ammonium nitrate. The precipitate was separated by filtration and recrystallized twice from methyl ethyl ketone to give 3.6 g. (12% yield) of 1-benzhydryloxy-guanidine nitrate (I) as fine, white needles which decomposed at 111° to 112° C.

Analysis.—Calcd. for $C_{14}H_{15}N_3O \cdot HNO_3$: N, 18.41. Found: N, 18.21.

Infrared spectra supported the structure.

On basifying an aqueous solution of the nitrate with sodium hydroxide or potassium hydroxide, the free base form, 1-benzhydryloxyguanidine, is obtained.

EXAMPLE 9

*1-(3,3-diphenylpropoxy)guanidine nitrate (I)*

3,3-diphenylpropoxyamine (II), obtained from 15.5 g. (0.069 mole) of its hydrochloride (prepared by reacting benzohydroxamic acid with 3,3-diphenylpropyl bromide in an ethanolic solution of sodium hydroxide to give 3,3-diphenyl-1-benzamidooxypropane, followed by hydrolysis with ethanolic hydrogen chloride) by treatment with alkali, was dissolved in 100 ml. of 50% ethanol. The solution was treated with 9.5 g. (0.069 mole) of 2-methyl-2-thiopseudourea sulfate and heated under reflux for 8 hours. Solvent was removed under reduced pressure. The gummy residue was dissolved in 300 ml. of methanol and 100 ml. of water, and the solution was saturated with ammonium nitrate and refrigerated. The supernatant solution was decanted from a small amount of precipitated oil and solid, diluted with 2 l. of water and again refrigerated. The precipitated solid was separated by filtration, washed with water and recrystallized from ethyl acetate to give 9.5 g. (43% yield) of 1-(3,3-diphenylpropoxy guanidine nitrate (I), which decomposed at 116° C.

Analysis.—Calcd. for $C_{16}H_{19}N_3O \cdot HNO_3$: C, 57.82; H, 6.07; N, 16.86. Found: C, 57.73; H, 6.00; N, 17.09.

Infrared spectra supported the structure.

On basifying an aqueous solution of the nitrate with sodium hydroxide or potassium hydroxide, the free base form, 1-(3,3-diphenylpropoxy)guanidine, is obtained.

EXAMPLE 10

A. *1-(2-phenoxyethoxy)guanidine nitrate (I)*

Nineteen grams (0.1 mole) of 2-phenoxyethoxyamine hydrochloride was converted to the free base (II) (J. Amer. Chem. Soc. 70, 2829) with alkali. The free base was mixed with 100 ml. of ethanol and 13.9 g. (0.1 mole) of 2-methyl-2-thiopseudourea sulfate. The mixture was heated under reflux for 6 hours, then evaporated to dryness on the steam bath under reduced pressure. The gummy residue was dissolved in 500 ml. of 50% aqueous methanol and the solution was saturated with ammonium nitrate. Methanol was evaporated on a steam bath under an air stream and the remaining solution was refrigerated. The precipitated solid was separated by filtration and recrystallized from ethyl acetate to give 9.5 g. (37% yield) of white product, 1-(2-phenoxyethoxy)guanidine nitrate (I) which decomposed sharply at 104° C.

Analysis.—Calcd. for $C_9H_{13}N_3O_2 \cdot HNO_3$: C, 41.86; H, 5.46; N, 21.70. Found: C, 41.66; H, 5.73; N, 21.58.

Infrared spectra supported the structure.

On basifying an aqueous solution of the nitrate with sodium hydroxide or potassium hydroxide, the free base form, 1-(2-phenoxyethoxy)guanidine is obtained.

B. *1-(2-phenoxyethoxy)guanidine and cyclohexanesulfamate thereof (I)*

A mixture of 20 g. (0.105 mole) of 2-phenoxyethoxy-amine hydrochloride (II) and 4.4 g. (0.105 mole) of cyanamide in toluene was heated under reflux to give oily 1-(2-phenoxyethoxy)guanidine hydrochloride (I). Basification of the hydrochloride afforded 17.45 g. (85% yield) of 1-(2-phenoxyethoxy)guanidine (I), with a melting point of 119 to 121° C. Recrystallization from isopropyl alcohol gave pure 1-(2-phenoxyethoxy)guanidine (I), melting at 121 to 123° C.

Analysis.—Calcd. for $C_9H_{13}N_3O_2$: C, 55.37; H, 6.71; N, 21.53. Found C, 55.45; H, 6.66; N, 21.72.

Infrared and ultraviolet spectra supported the structure.

By neutralization with cyclohexanesulfamic acid, the free base, 1-(2-phenoxyethoxy)guanidine was converted to its cyclohexanesulfamate (I). This salt exhibited double melting point behavior; it first melted at 85 to 87° C., then resolidified and melted at 95 to 96° C.

Aanlysis.—Calcd. for $C_9H_{13}N_3O_2 \cdot C_6H_{13}NO_3S$: C, 48.11; H, 7.00; N, 14.96; S, 8.56. Found: C, 48.22; H, 7.10; N, 15.11; S, 8.72.

EXAMPLE 11

*1-(1-methyl-2-phenylethoxy)guanidine and cyclohexanesulfamate thereof (I)*

Following the procedure of Example 1B but substituting 1-methyl-2-phenylethoxyamine hydrochloride (II) (Helv. Chim. Acta 45, 1381) for benzyloxyamine hydrochloride (II), and maintaining the temperature of the reaction mixture at 83–84° C., yielded 1-(1-methyl-2-phenylethoxy)guanidine (I). The free base was neutralized with cyclohexanesulfamic acid to obtain its cyclohexanesulfamate (I), melting point 128 to 130° C.

*Analysis.*—Calcd. for $C_{10}H_{15}N_3O \cdot C_6H_{13}NO_3S$: C, 51.59; H, 7.58; N, 15.04; S, 8.61. Found: C, 52.06; H, 7.62; N, 15.08; S, 8.74

Following the procedures of Example 1 (A and B) but substituting for the starting materials employed therein, the following free bases or acid addition salts of Formula II:

(1) 3-methylbenzyloxyamine (Belgian Patent 612,879),
(2) 4-ethylbenzyloxyamine [J. Chem. Soc. 3915 (1962)],
(3) 4-isopropylbenzyloxyamine [J. Chem. Soc. 3915 (1962)],
(4) 4-butylbenzyloxyamine [J. Chem. Soc. 3915 (1962)],
(5) 4-sec.butylbenzyloxyamine [J. Chem. Soc. 3915 (1962)],
(6) 4-tert.butylbenzyloxyamine [J. Chem. Soc. 3915 (1962)],
(7) 2-phenylpropoxyamine (Helv. Chim. Acta 45, 1381),
(8) 1-naphthylmethoxyamine [J. Chem. Soc. 229 (1960)],
(9) 2-naphthylmethoxyamine [J. Chem. Soc. 229 (1960)],
(10) 2-methyl-1-naphthylmethoxyamine [J. Chem. Soc. 229 (1960)],
(11) 4-methyl-1-naphthylmethoxyamine [J. Chem. Soc. 3915 (1962)],
(12) 2-chlorobenzyloxyamine (Belgian Patent 612,879),
(13) 4-bromobenzyloxyamine [J. Chem. Soc. 229 (1960)],
(14) 2,4-dichlorobenzyloxyamine (Can. J. Chem. 38, 343),
(15) 3,4-dichlorobenzyloxyamine (Can. J. Chem. 38, 343),
(16) 1-chloro-2-naphthylmethoxyamine [J. Chem. Soc. 3915 (1962)]
(17) 1-bromo-2-naphthylmethoxyamine [J. Chem. Soc. 229 (1960)]
(18) 4-bromo-1-naphthylmethoxyamine [J. Chem. Soc. 3915 (1962)],
(19) 2-nitrobenzyloxyamine [J. Chem. Soc. 229 (1960)],
(20) 4-nitrobenzyloxyamine [J. Chem. Soc. 229 (1960)], and
(21) 2-(3,4,5-trimethoxyphenyl)ethoxyamine (J. Med. Pharm. Chem. 4, 51), yields, respectively, the free bases or acid addition salts of the following products of Formula I:

(1) 1-(3-methylbenzyloxy)guanidine,
(2) 1-(4-ethylbenzyloxy)guanidine,
(3) 1-(4-isopropylbenzyloxy)guanidine,
(4) 1-(4-butylbenzyloxy)guanidine,
(5) 1-(4-sec.butylbenzyloxy)guanidine,
(6) 1-(4-tert.butylbenzyloxy)guanidine,
(7) 1-(2-phenylpropoxy)guanidine,
(8) 1-(1-naphthylmethoxy)guanidine,
(9) 1-(2-naphthylmethoxy)guanidine,
(10) 1-(2-methyl-1-naphthylmethoxy)guanidine,
(11) 1-(4-methyl-1-naphthylmethoxy)guanidine,
(12) 1-(2-chlorobenzyloxy)guanidine,
(13) 1-(4-bromobenzyloxy)guanidine,
(14) 1-(2,4-dichlorobenzyloxy)guanidine,
(15) 1-(3,4-dichlorobenzyloxy)guanidine,
(16) 1-(1-chloro-2-naphthylmethoxy)guanidine,
(17) 1-(1-bromo-2-naphthylmethoxy)guanidine,
(18) 1-(4-bromo-1-naphthylmethoxy)guanidine,
(19) 1-(2-nitrobenzyloxy)guanidine,
(20) 1-(4-nitrobenzyloxy)guanidine, and
(21) 1-[2-(3,4,5-trimethoxyphenyl)ethoxy]guanidine.

EXAMPLE 12

*1-(4-phenylbenzyloxy)guanidine (I)*

Following the procedure of Example 7A(a) but substituting 4-phenylbenzyl chloride for 2,6-dichlorobenzyl chloride, there was obtained N-(4-phenylbenzyloxy)phthalimide. The latter was reacted with hydrazine hydrate according to the procedure of Example 7A(b) to obtain 4-phenylbenzyloxyamine, which in turn was treated with hydrogen chloride to obtain 4-phenylbenzyloxyamine hydrochloride (II).

A toluene suspension of 8.85 g. (0.038 mole) of 4-phenylbenzyloxyamine hydrochloride (II) and 1.58 g. (0.038 mole) of cyanamide was stirred under nitrogen and heated under reflux for 6 hours. The solvent was evaporated from the reaction mixture under reduced pressure and the residue was extracted with hot ethanol. The ethanol solution was filtered and the filtrate was concentrated until crystallization occurred. After cooling, 1.41 g. of solid was removed by filtration. The filtrate was evaporated to dryness, leaving 9.4 g. of a viscous residue which solidified on standing for about 16 hours. This residue was dissolved in methanol and the solution was basified with sodium methoxide. The resulting precipitate was diluted with water and the mixture was stirred. The solid weighed 6.3 g. after being collected, washed with water, and dried; it had a melting point of 156 to 166° C. The solid was dissolved in ethyl acetate and the solution was clarified with diatomaceous earth and concentrated; 3.74 g. of crystalline product was obtained therefrom that melted at 175 to 177° C. The product was recrystallized from ethanol to give 3.22 g. of pure 1-(4-phenylbenzyloxy)guanidine (I) having a melting point of 175 to 176° C.

*Analysis.*—Calcd. for $C_{14}H_{15}N_3O$: C, 69.69; H, 6.27; N, 17.42. Found: C, 69.73; H, 6.40; N, 17.69

The infrared and ultraviolet spectra were consistent with the structure.

The hydrochloric, hydrobromic and sulfuric acid addition salts of the above produced free base, 1-(4-phenylbenzyloxy)guanidine, are prepared by adding ethereal hydrogen chloride, hydrogen bromide and sulfuric acid, respectively, to a solution of the free base in ethyl acetate.

EXAMPLE 13

*1-[2-(4-biphenylyloxy)ethoxy]guanidine (I)*

(a) *2-(4-biphenylyloxy)ethyl chloride.*—To a chilled suspension of 26 g. (0.12 mole) of 2-(4-biphenylyloxy)ethanol (J. Amer. Chem. Soc. 57, 527) in 200 ml. of benzene containing 9.75 ml. of pyridine, was slowly added 9 ml. of thionyl chloride with vigorous stirring. The mixture was stirred briefly at room temperature, heated under reflux for 3 hours, washed with water and then with brine, and dried over magnesium sulfate. The solution was concentrated and the benzene was displaced with methanol. On cooling, 22.85 g. of material melting at 100 to 102 C. was obtained. Recrystallization from methanol gave an analytical sample of 2-(4-biphenylyloxy)ethyl chloride, with a melting point of 101 to 103° C.

*Analysis.*—Calcd. for $C_{14}H_{13}ClO$: C, 72.26; H, 5.63; Cl, 15.24. Found: C, 72.60; H, 5.42; Cl, 14.87.

(b) *N-[4-biphenylyloxy)ethoxy]phthalimide*

A solution of 28.2 g. (0.12 mole) of 2-(4-biphenylyloxy)ethyl chloride [prepared as in (a), above], 19.8 g. of N-hydroxyphthalimide, and 37 ml. of triethylamine in 185 ml. of dimethylformamide was stirred and heated on the steam bath for 28 hours. The solution was cooled and diluted with stirring with 250 ml. of water. The resulting solid was collected, washed with water, dissolved with methylene chloride, and the solution was dried over sodium sulfate. The methylene chloride was displaced with ethanol and the solution was allowed to cool, whereupon 11.1 g. of product, melting at 168 to 170° C., was recovered. Recrystallization of a portion from a mixture of methylene chloride and ethanol gave an analytical sample of N-[2-(4-biphenylyloxy)ethoxy]phthalimide with a melting point of 170 to 171° C.

*Analysis.*—Calcd. for $C_{22}H_{17}NO_4$: C, 73.53; H, 4.77. Found: C, 73.73; H, 5.10.

The infrared and ultraviolet spectra were consistent with the expected structure.

(c) *2-(4-biphenylyloxy)ethoxyamine hydrochloride* –

A stirred solution of 9.1 g. (0.025 mole) of N-[2-(4-biphenylyloxy)ethoxy]phthalimide [from (b), above] in 200 ml. of methylene chloride was treated with 1.27 g. of hydrazine hydrate in 5 ml. of methanol. After 5 hours the precipitate was filtered off and washed with methylene chloride. The combined filtrate and washings were evaporated to dryness under reduced pressure. The residue was extracted with ethyl acetate and the extracts were washed with water, dried over potassium carbonate and magnesium sulfate, and acidified with an isopropyl alcohol solution of hydrogen chloride, to give 5.6 g. of 2-(4-biphenylyloxy ethoxyamine hydrochloride, which melted at 227° C. with decomposition. The hydrochloride was converted with alkali into its free base, which had a melting point of 128.5° to 130° C. after recrystallization from isopropyl alcohol. The free base was reconverted with hydrogen chloride to its hydrochloride which melted at 225 to 227° C. A sample was recrystallized from a mixture of ethanol and isopropyl alcohol to give an analytical sample of 2-(4-biphenylyloxy) ethoxyamine hydrochloride having a melting point of 225 to 226° C.

*Analysis.*—Calcd. for $C_{14}H_{15}NO_2 \cdot HCl$: C, 63.27; H, 6.07; N, 5.27; Cl, 13.34. Found: C, 63.23; H, 6.06; N, 5.59; Cl, 13.30.

The infrared and ultraviolet spectra were consistent with the structure.

(d) *1-[2-(4-biphenylyoxy)ethoxy]guanidine (I)*

A toluene suspension containing 4 g. (0.15 mole) of 2 - (4-biphenylyloxy)ethoxyamine hydrochloride (II) [from (c), above] and 0.64 g. (0.015 mole) of cyanamide was stirred under nitrogen and heated under reflux for 4 hours. After being allowed to cool the solid was collected, washed with ethyl acetate and dried, to yield 4.09 g. of 1-[2-(4-biphenylyloxy)ethoxy]guanidine hydrochloride, melting at 174 to 176° C. with decomposition. This material was dissolved in methanol and basified with sodium methoxide. The resulting suspension was diluted with water and the resulting solid was collected, washed with aqueous methanol, and dried, to give 2.36 g. of free base, melting at 185 to 187.5° C. Recrystallization from a mixture of ethanol and isopropyl alcohol gave 2.21 g. of an analytical sample of 1-[2-(4-biphenylyloxy)ethoxy] guanidine (I), having a melting point of 186.5 to 188° C.

*Analysis.*—Calcd. for $C_{15}H_{17}N_3O_2$: C, 66.40; H, 6.32; N, 15.49. Found: C, 66.09; H, 6.55; N, 15.72.

The infrared and ultraviolet spectra were consistent with the structure.

The hydrochloric, hydrobromic and sulfuric acid addition salts of the above produced free base, 1-[2-(4-biphenylyloxy)ethoxy]guanidine, are prepared by adding ethereal hydrogen chloride, hydrogen bromide and sulfuric acid, respectively, to a solution of the free base in ethyl acetate.

EXAMPLE 14

*1-benzyloxy-1-methylguanidine hydrochloride (I)*

A toluene suspension of 7.56 g. (0.044 mole) of N-methylbenzyloxyamine hydrochloride (II) (Helv. Chim. Acta 45, 1381) and 1.83 g. of cyanamide was stirred at room temperature. After an hour the solid became gummy. The mixture was heated under reflux for 1.25 hours, during which period the gummy material solidified. This was collected, washed with benzene and dried, to yield 8.37 g. of crude product, which melted at 135 to 143° C. This material was purified by dissolving it in water, adding sodium hydroxide and sodium chloride, and chilling to give 3.58 g. of product with a melting point of 182 to 184° C. Recrystallization from isopropyl alcohol gave an analytical sample of 1-benzyloxy-1-methylguanidine hydrochloride (I) with a melting point of 183 to 183.5° C.

*Analysis.*—Calcd. for $C_9H_{13}N_3O \cdot HCl$: C, 50.12; H, 6.54; N, 19.48; Cl, 16.44. Found: C, 50.22; H, 6.04; N, 19.93; Cl, 16.54.

The infrared and ultraviolet spectra were consistent with the structure.

On basifying a methanolic solution of the hydrochloride with sodium methoxide, the free base form, 1-benzyloxy-1-methylguanidine, is obtained.

EXAMPLE 15

*1-benzyloxy-3,3-dimethylguanidine cyclohexanesulfamate (I)*

A solution of 16 g. (0.1) mole of benzyloxyamine hydrochloride (II) and 7 g. of dimethylcyanamide was stirred under nitrogen and heated in an oil bath at 150 to 160° C. for 1.5 hours. The resulting gummy material was suspended in water and basified; the oil that separated was extracted with ether and the extracts were washed with water, dried, and the solvent was evaporated to dryness under reduced pressure to obtain 15.5 g. of oil. The oil was dissolved in 155 ml. of ethyl acetate and the solution was treated with a solution of 14.4 g. of cyclohexanesulfamic acid in 150 ml. of acetone, to give 24.2 g. of 1-benzyloxy - 3,3 - dimethylguanidine cyclohexanesulfamate (I), melting at 119 to 122° C.

*Analysis.* — Calcd. for $C_{10}H_{15}N_3O \cdot C_6H_{13}NO_3S$: C, 51.59; H, 7.58; N, 15.04; S, 8.61. Found: C, 51.50; H, 7.61; N, 15.05; S, 8.60.

The infrared and ultraviolet spectra were consistent with the structure.

On basifying an aqueous solution of the cyclohexanesulfamate with sodium hydroxide or potassium hydroxide, the free base form, 1,-benzyloxy-3,3-dimethylguanidine, is obtained.

Following the procedure of Example 15 but substituting ethylcyanamide and diisobutylcyanamide for dimethylcyanamide, there are obtained 1-benzyloxy-3-ethylguanidine cyclohexanesulfamate and 1-benzyloxy - 3,3 - diisobutylguanidine cyclohexanesulfamate, respectively. By basifying an aqueous solution of each salt, the corresponding free base is obtained.

EXAMPLE 16

*1-benzyloxy-2,3-diisopropylguanidine hydrochloride (I)*

A mixture of 12.3 g. (0.10 mole) of benzyloxyamine, 6.3 g. (0.05 mole) of diisopropylcarbodiimide, and 10 ml. of tert.butyl alcohol was heated on a steam bath for 14.5 hours. Volatile materials were removed by heating under reduced pressure (100° C. at 10 mm. Hg) to leave a blue oil. The oil was dissolved in acetone, and the solution was briefly heated under reflux and then evaporated to dryness to leave 10.8 g. of pale green oil. This was dissolved in acetone and the solution was treated with a solution of 8.95 g. of cyclohexanesulfamic acid in acetone. On chilling for about 16 hours, only a trace of insoluble material separated and was removed by filtration. The filtrate was evaporated to dryness, leaving an oil which was distributed between ether and water. The aqueous layer was separated, basified and extracted with ether. The ether extract was dried with potassium carbonate and magnesium sulfate and evaporated to dryness, leaving 5.95 g.

of yellow oil. Dissolving this in a mixture of ethyl acetate and ether, and acidifying this solution with an isopropyl alcohol solution of hydrogen chloride, gave 5.8 g. of product, which melted at 112 to 121° C. Recrystallization from a mixture of isopropyl alcohol and ethyl acetate gave pure 1 - benzyloxy-2,3-diisopropylguanidine hydrochloride (I), with a melting point of 125 to 126° C.

*Analysis.*—Calcd. for $C_{14}H_{23}N_3O \cdot HCl$: C, 58.83; H, 8.46; N, 14.70; Cl, 12.41. Found: C, 58.66; H, 8.48; N, 14.61; Cl, 12.46.

The infrared and ultraviolet spectra were consistent with the structure.

On basifying an aqueous solution of the hydrochloride with sodium hydroxide or potassium hydroxide, the free base form, 1-benzyloxy-2,3-diisopropylguanidine, is obtained.

Following the procedure of Example 16 but substituting N-methylbenzyloxyamine for benzyloxyamine, there is obtained 1-benzyloxy-1-methyl - 2,3 - diisopropylguanidine hydrochloride. By basifying an aqueous solution of the hydrochloride, the corresponding free base is obtained.

As indicated heretofore, the compounds of Formula I of this invention are useful in therapy for their anorexigenic activity, and particularly in the treatment of obesity. Administration to mammals, including humans, depends on the particular compound involved, severity of the obesity being treated and the individuals response to the medication. In general, a dose of about 5 to about 1200 mg. of each of the compounds exempliefied in Examples 1 to 16 and embraced within Formula I is given one to three times a day (preferably about 50 to about 400 mg. thereof one to three times a day) in the treatment of obesity, which is favorably influenced, i.e., by loss of weight, by the anorexigenic activity of the aforesaid compounds when incorporated in conventional pharmaceutical compositions.

The compounds of Formula I are presented for oral administration in solid and liquid unit dosage forms, such as tablets, capsules, powders, granules, syrups, elixirs, and the like, containing suitable quantities of the said compound.

Powders are quite simply prepared by comminuting a compound of the Formula I to a suitably fine size and mixing with a similarly comminuted diluent. The diluent can be an edible carbohydrate material such as starch. Advantageously, an artificial sweetening agent or sugar is present as well as a flavoring oil. Dry granulations for reconstitution with water are prepared utilizing water-soluble diluents. A powder mixture of finely divided compound of the Formula I and a water-soluble diluent such as sucrose, glucose, and the like, is wetted with a binder such as acacia mucilage or gelatin solution and forced through a screen to form granules which are allowed to dry. Advantageously, a thickening or suspending agent such as methyl-cellulose is present as well as a wetting agent and flavoring oil.

Capsules are produced by appearing a powder mixture as hereinbefore described and filling into formed gelatin sheaths. Advantageously, as an adjuvant to the filling operation, a lubricant such as talc, magnesium stearate and calcium stearate is added to the powder mixture before the filling operation.

Tablets are made by preparing a powder mixture, wet granulating or dry granulating by slugging, adding a lubricant and pressing into tablets. The powder mixture is prepared by mixing the compound of the Formula I suitably comminuted, with a diluent or base such as starch, lactose, kaolin, dicalcium phosphate and the like. The powder mixture can be granulated by wetting with a binder such as corn syrup, gelatin solution, methylcellulose solution or acacia mucilage and forcing through a screen. As an alternative to granulating, the powder mixture can be slugged, i.e., run through the tablet machine and the resulting large tablets broken into pieces (slugs). The slugs can be lubricated to prevent sticking to the tablet-forming die by means of the addition of stearic acid, a stearate salt, talc or mineral oil. The lubricated mixture is then compressed into tablets.

Advantageously the tablet can be provided with a protective coating consisting of a sealing coat of shellac, a coating of sugar and methylcellulose and a polish coating of Carnauba wax.

Oral fluids are prepared in unit dosage forms such as syrups and elixirs wherein each teaspoonful of composition contains a predetermined amount of a compound of the Formula I for administration.

A syrup is prepared by dispersing a compound of the Formula I in a suitably flavored aqueous sucrose solutioin. Similarly an elixir is prepared utilizing a hydroalcoholic vehicle. Elixirs are advantageous vehicles for use when another therapeutic agent which is not sufficiently water soluable is to be included in the composition.

For parenteral adminstration aqeuous fluid unit dosage forms can be prepared. In preparing the parenteral form, a measured amount of a water soluble compound of the Formula I is placed in a vial, the vial and its contents sterilized and sealed. An accompanying vial of sterile water is provided as a vehicle to form a solution prior to administration. Advantageously the sterile water can have dissolved therein a local anesthetic and buffering agents.

Alternatively, a parenteral suspension can be prepared by suspending a compound of the Formula I in a parenterally acceptable vegetable oil with or without additional adjuvants.

In addition to oral and parenteral administration, the rectal route can be utilized. A compound of the Formula I can be administered by means of a suppository. A vehicle which has a melting point at about body temperature or one that is readily soluble can be utilized. For example, cocoa butter and various polyethylene glycols can serve as the vehicle.

For the treatment of domestic birds and animals by oral administration, a compound of the Formula I is conveniently prepared in the form of a food premix. The food premix can comprise the active material in admixture with an edible pharmaceutical diluent of the type previously mentioned such as starch, oatmeal, flour, calcium carbonate, talc, dried fish meal and the like nontoxic edible diluents. The premix is then conveniently added to the regular feed, thereby providing medication to the mammal or bird in the course of feeding.

The term unit dosage form as used in the specification and claims refers to physically discrete units suitable as unitary dosages for human and animal subjects, each unit containing a predetermined quantity of active material calculated to produce the desired effect in association with the required pharmaceutical diluent, carrier or vehicle. The specifications for the novel unit dosage forms of this invention are dictated by and are directly dependent on (a) the unique characteristics of the active material and the particular therapeutic effect to be achieved, and (b) the limitations inherent in the art of compounding such an active material for therapeutic use as disclosed in detail in this specification, these being features of the present invention. Examples of suitable oral unit dosage forms in accord with this invention are tablets, capsules, powderpackets, granules, wafers, teaspoonfuls, segregated multiples of any of the foregoing, and other forms as herein described.

The following examples illustrate the incorporation of the active ingredients of this invention in pharmaceutical formulations.

EXAMPLE 17

*Tablets*

One thousand tablets, each containing 100 mg. of 1-(3-phenylpropoxy)guanidine cyclohexanesulfamate (I), are prepared from the following types and amounts of ingredients:

| | Grams |
|---|---|
| 1-(3-phenylpropoxy)guanidine cyclohexanesulfamate (I) | 100 |
| Lactose | 250 |
| Starch | 100 |
| Calcium stearate | 10 |
| Talc | 10 |

The finely powdered ingredients are mixed thoroughly and then tableted by a slugging procedure.

Tablets so prepared are useful in the treatment of obesity in adults at a dose of 1 tablet taken 30 minutes before meals.

Following the above procedure, tablets each containing 200 and 300 mg. of 1-(3-phenylpropoxy)guanidine cyclohexanesulfamate (I) are prepared by increasing the amount of 1-(3-phenylpropoxy)guanidine cyclohexanesulfamate (I) to 200 and 300 g.

EXAMPLE 18

*Tablets*

To prepare 1000 tablets (50 mg.), 200 g. of talc is added to 100 g. of calcium stearate, and the resulting mixture is slugged together with 50 g. of 1-(3-phenylpropoxy)guanidine cyclohexanesulfamate (I). The slugs are reduced to granules through a 14-mesh screen. A lactose granulation is prepared from 200 g. of lactose, 50 g. of starch and 50 g. of sucrose, the latter two constituting the granulating paste. The 1-(3-phenylpropoxy)guanidine cyclohexanesulfamate (I) and lactose granulations are mixed, 10 g. of talc and 10 g. of calcium stearate are added, and the resulting mixture is compressed into tablets, each table containing:

| | Milligrams |
|---|---|
| 1-(3-phenylpropoxy)guanidine cyclohexanesulfamate (I) | 50 |
| Talc | 210 |
| Calcium stearate | 110 |
| Lactose | 200 |
| Starch | 50 |
| Sucrose | 50 |

The tablets so prepared are useful in the treatment of obesity in humans at a dosage of half to 1 tablet 3 times a day, taken 30 minutes before meals.

EXAMPLE 19

*Hard-gelatin capsules*

One thousand two-piece hard gelatin capsules, each containing 100 mg. of 1-(3-phenylpropoxy)guanidine cyclohexanesulfamate (I) are prepared from the following types and amounts of ingredients:

| | Grams |
|---|---|
| 1-(3-phenylpropoxy)guanidine cyclohexanesulfamate (I) | 100 |
| Corn starch | 75 |
| Magnesium stearate, powder | 25 |
| Talc | 25 |

The finely powdered ingredients are mixed thoroughly and then encapsulated in the usual manner.

The capsules so prepared are useful in the treatment of obesity at a dosage of 1 capsule taken 30 minutes before meals.

Following the above procedure, capsules each containing 25 and 50 mg. of 1-(3-phenylpropoxy)guanidine cyclohexanesulfamate (I) are prepared by decreasing the amount of the 1-(3-phenylpropoxy(guanidine cyclohexanesulfamate (I) to 25 and 50 g.

EXAMPLE 20

*Syrup*

A syrup for oral administration containing 50 mg. of 1-(3-phenylpropoxy)guanidine cyclohexanesulfamate (I) in each 5 cc. is prepared from the following types and amounts of ingredients:

| | | |
|---|---|---|
| 1-(3-phenylpropoxy)guanidine cyclohexanesulfamate (I) | gm | 10 |
| Ascorbic acid | gm | 10 |
| Methylparaben | gm | 0.75 |
| Propylparaben | gm | 0.25 |
| Sucrose | gm | 500 |
| Orange oil flavor | gm | .5 |
| F.D.C. orange dye | gm | 2.5 |
| Deionized water, q.s. ad | cc | 1000 |

The ingredients are dissolved in sufficient water to make 1000 cc. of syrup.

The syrup as prepared is useful in the treatment of obesity at a dose of 1 or 2 teaspoonfuls taken 30 minutes before meals.

EXAMPLE 21

*Parenteral suspension*

A composition suitable for injection wherein each milliliter contains 50 milligrams of active ingredient is as follows:

| | | |
|---|---|---|
| Sterile micronized 1-(3-phenylpropoxy)guanidine cyclohexanesulfamate (I) | gm | 5.0 |
| Polyethylene glycol 4000 | gm | 3.0 |
| Sodium chloride U.S.P. | gm | 0.9 |
| Polysorbate 80 U.S.P. | gm | 0.4 |
| Benzyl alcohol N.F. | gm | 0.9 |
| Water for injection, q.s. | cc | 100 |

The polyethylene glycol, sodium chloride, Polysorbate 80 and benzyl alcohol are dissolved in water and the solution sterilized by passage through a sterilizing filter. Sterile 1-(3-phenylpropoxy)guanidine cyclohexanesulfamate (I) is then aseptically mixed with the sterile vehicle and the whole homogenized. The suspension is filled aseptically into sterile 2 milliliter ampoules.

The contents of these ampoules when injected intramuscularly three times a day is useful in the treatment of obesity.

The procedures described above in Examples 17 through 21 for the preparation of compositions of 1-(3-phenylpropoxy)guanidine cyclohexanesulfamate (I) can also be employed in the production of medicaments wherein the active ingredient is another compound embraced by Formula I, e.g., 1-benzyloxyguinadine,
1-benzyloxyguanidine nitrate,
1-benzyloxyguanidine cyclohexanesulfamate,
1-(2-phenylethoxy)guanidine,
1-(2-phenoxyethoxy)guanidine nitrate,
1-(2-phenoxyethoxy)guanidine cyclohexanesulfamate,
1-(2-phenylethoxy)guanidine cyclohexanesulfamate,
1-(3-phenylpropoxy)guanidine nitrate,
1-(4-methoxybenzyloxy)guanidine nitrate,
1-(4-chlorobenzyloxy)guanidine nitrate,
1-(2,6-dichlorobenzyloxy)guanidine hydrochloride,
1-benzhydryloxyguanidine nitrate,
1-(3,3-diphenylpropoxy)guanidine nitrate,
1-(1-methyl-2-phenylethoxy)guanidine,
1-(1-methyl-2-phenylethoxy)guanidine cyclohexanesulfamate,
1-(4-phenylbenzyloxy)guanidine,
1-[2-(biphenyloxy)ethoxy]guanidine,
1-benzyloxy-1-methylguanidine hydrochloride,
1-benzyloxy-3,3-dimethylguanidine cyclohexanesulfate and
1-benzyloxy-2,3-diisopropylguanidine hydrochloride.

While the treatment of obesity disclosed following Examples 17 through 21 utilizes 1-(3-phenylpropoxy)guanidine cyclohexanesulfamate (I), similarly effective therapy is provided with comparable dosages by employing medicaments wherein the active ingredient is another compound embraced by Formula I, e.g., 1-benzyloxyguanidine,
1-benzyloxyguanidine nitrate,
1-benzyloxyguanidine cyclohexanesulfamate,
1-(2-phenylethoxy)guanidine,
1-(2-phenoxyethoxy)guanidine nitrate,
1-(2-phenoxyethoxy)guanidine cyclohexanesulfamate,
1-(2-phenylethoxy)guanidine cyclohexanesulfamate,
1-(3-phenylpropoxy)guanidine nitrate,
1-(4-methoxybenzyloxy)guanidine nitrate,
1-(4-chlorobenzyloxy)guanidine nitrate,
1-(2,6-dichlorobenzyloxy)guanidine hydrochloride,
1-benzhydryloxyguanidine nitrate,
1-(3,3-diphenylpropoxy)guanidine nitrate,
1-(1-methyl-2-phenylethoxy)guanidine,
1-(1-methyl-2-phenylethoxy)guanidine cyclohexanesulfamate,
1-(4-phenylbenzyloxy)guanidine,
1-[2-(biphenyloxy)ethoxy]guanidine,
1-benzyloxy-1-methylguanidine hydrochloride,
1-benzyloxy-3,3-dimethylguanidine cyclohexanesulfamate and
1-benzyloxy-2,3-diisopropylguanidine hydrochloride.

I claim:

1. A therapeutic composition comprising: about 5 to about 1200 mg. of a compound selected from the group consisting of the free base and acid addition salt forms of a compound of the formula

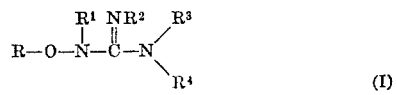

wherein R is selected from the group consisting of aralkyl and aryloxyalkyl, wherein the aryl moiety of R contains from six through twelve carbon atoms and is substituted by up to three members of the group consisting of hydrogen, alkyl of from one through four carbon atoms, alkoxy of from one through three carbon atoms, chlorine, bromine, nitro and phenyl; $R^1$, $R^2$, $R^3$ and $R^4$ are selected from the group consisting of hydrogen and alkyl of from one through four carbon atoms, dispersed in a pharmaceutical carrier.

2. A therapeutic composition comprising: about 5 to about 1200 mg. of 1-(3-phenylpropoxy)guanidine cyclohexanesulfamate dispersed in a pharmaceutical carrier.

3. A method for reducing weight in mammals comprising: administering to mammals a weight reducing amount of a compound selected from the group consisting of the free base and acid addition salt forms of a compound of the formula

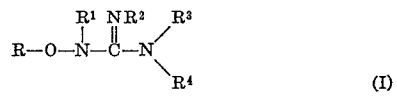

wherein R is selected from the group consisting of aralkyl and aryloxyalkyl, wherein the aryl moiety of R contains from six through twelve carbon atoms and is substituted by up to three members of the group consisting of hydrogen, alkyl of from one through four carbon atoms, alkoxy of from one through three carbon atoms, chlorine, bromine, nitro and phenyl; $R^1$, $R^2$, $R^3$ and $R^4$ are selected from the group consisting of hydrogen and alkyl of from one through four carbon atoms.

4. A method for reducing weight in mammals comprising: administering to mammals from about 5 to about 1200 mg. of 1-(3-phenylpropoxy)guanidine cyclohexanesulfamate.

No references cited.

ALBERT T. MEYERS, Primary Examiner
S. MANELLO, Assistant Examiner

U.S. Cl. X.R.
424—316